Sept. 25, 1962     M. B. SAMPSON     3,055,670
HIGH PRESSURE SEAL FOR A FLUID ACTUATOR
Filed Nov. 23, 1959
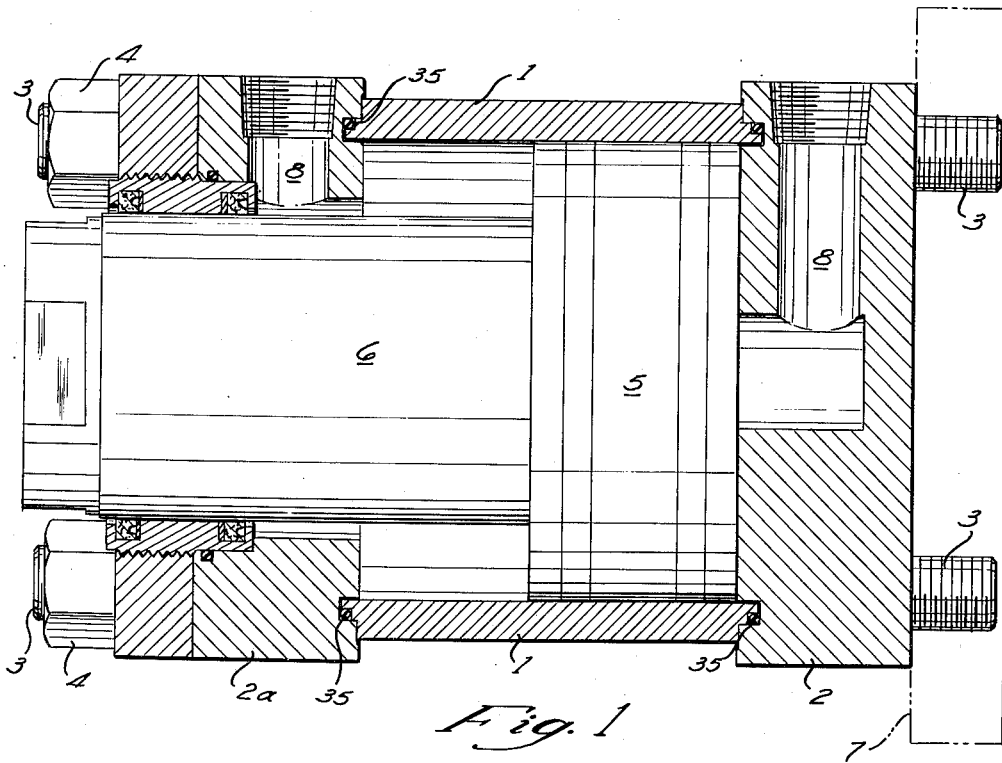
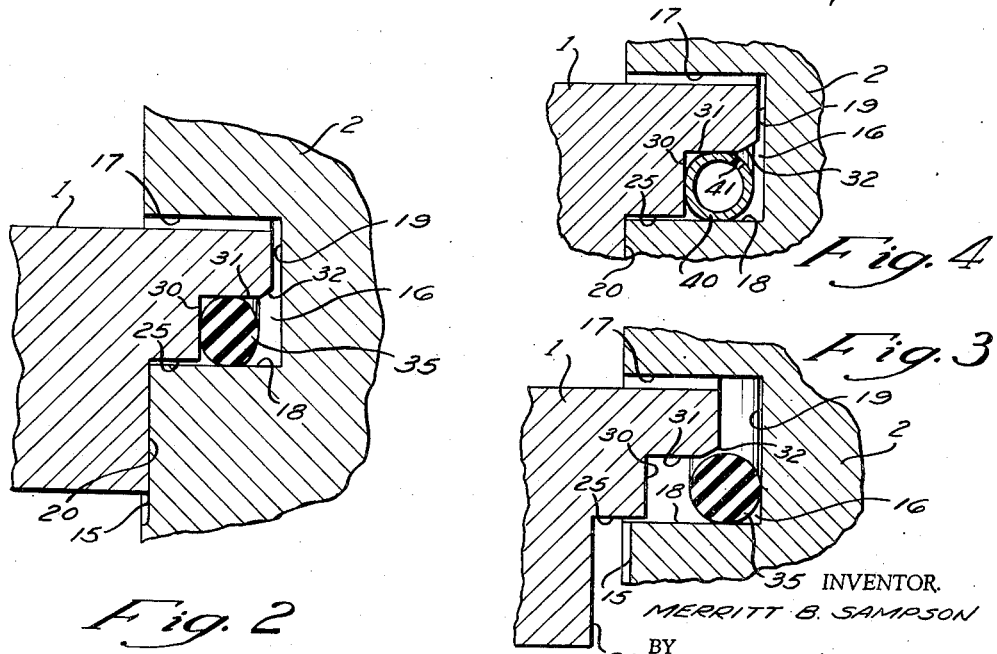
INVENTOR.
MERRITT B. SAMPSON
BY WATTS & EDGERTON
B. D. Watts
ATTORNEYS

United States Patent Office 3,055,670
Patented Sept. 25, 1962

3,055,670
HIGH PRESSURE SEAL FOR A FLUID ACTUATOR
Merritt B. Sampson, Cleveland, Ohio, assignor to The S-P Manufacturing Corporation, Solon, Ohio, a corporation of Ohio
Filed Nov. 23, 1959, Ser. No. 854,651
6 Claims. (Cl. 277—168)

This invention relates to the art of sealing against the escape of fluid and is particularly concerned with means for sealing the joint at the end of a metal tube against fluid pressures of several thousand pounds pressure per square inch (p.s.i.).

Many inventors have proposed numerous devices for preventing the escape of fluids under pressure between opposed annular metal surfaces, but so far as I am aware, none of such devices has been entirely satisfactory.

One of such devices had an O-ring in a groove and bearing on the inner surface of the tube. That device was satisfactory with pressures up to about 2000 p.s.i. However where subjected to higher pressures the tube expanded and the ring tended to extrude into the space provided by such expansion. The extruded material was cut when the tube returned to its original position with decrease in the pressure and such cutting permitted escape of fluid past the ring.

Another of such devices sought to provide a fluid tight seal by having a conical surface on a tube seating on a conical surface of a groove in the head with a gasket of synthetic resin material of low deformability and high temperature resistance between the end of the tube and the bottom of the groove. Under mechanical stresses tending to move the tube and head apart axially, the conical surfaces moved apart and destroyed the seal.

The present invention aims to provide a joint between two annular metal surfaces which will prevent escape of fluid between those surfaces, particularly gases and liquids under pressures up to or above 5000 p.s.i. and under varying operating conditions including widely varying temperatures. Succinctly stated, this aim is achieved by means of a tube seated on a head and being out of contact otherwise with the head and forming a radially very short annular space between the tube and the head and a resilient ring in a notch on the tube and deformed radially between the tube and head and closing said annular space.

The present invention will be better understood by those skilled in the art from the following description and the drawings which accompany and form a part of the specification and, in which:

FIGURE 1 is a longitudinal sectional view of a high pressure hydraulic cylinder provided with a seal embodying the present invention;

FIGURE 2 is an enlarged fragmentary, cross-sectional view showing the seal of FIGURE 1 in which the sealing ring is made of non-metallic material;

FIGURE 3 is a view similar to FIGURE 2 but showing the position of the parts in the early stage of assembly; and, FIGURE 4 is a view similar to FIGURE 2 but showing a metallic seal ring.

FIGURE 1 shows one form of fluid pressure actuator embodying the present invention. Specifically, the actuator of FIGURE 1 is commonly known as a high pressure hydraulic cylinder. The device of FIGURE 1 includes a tube or cylinder 1, heads 2 and 2a at the ends thereof, tie rods 3 and nuts 4 for holding the heads and tube in assembled position, a piston 5 in the cylinder and a piston rod 6 extending through head 2a and gland 6. At one end, rods 3 are threaded into a mounting plate 7. Seals embodying the present invention are provided at each end of the tube or cylinder 1 in heads 2 and 2a.

Each head is provided with a passage 8 for fluid which communicates with the interior of cylinder 1. Each passage 8 is threaded at its outer end for connection to a fluid carrrying pipe (not shown).

The seals shown at each end of cylinder 1 in FIGURE 1 are alike, and one of those seals is shown on an enlarged scale in FIGURE 2. In that figure, the head 2 is shown as having a plain or flat, tube or cylinder seating surface 15 and an annular groove 16. This groove has annular, concentric inner and outer sides or surfaces 17 and 18 and a bottom 19. It is to be understood that the inner surface or side 17 of groove 16 takes no part in the sealing action and, hence, may be omitted if desired. The outer side 18 of groove 16 is normal to the tube seating surface 15.

Tube or cylinder 1 has a transverse or radial seating surface 20 which is parallel to, and seats on, surface 15 of the head. When the nuts 4 are turned on the tie rods 3, the heads 2 and 2a of the device of FIGURE 1 will be pressed tightly against the ends of the tube 1 with surfaces 20 and 15 bearing on one another and limiting the extent of movement of the heads toward one another.

Each end of tube 1 has an end portion which projects into the adjacent head beyond surface 15 of the latter. In FIGURE 2, the end portion is shown as projecting into groove 16. This end portion does not contact the head but is provided with an axially extending cylindrical surface 25 which is only slightly less in diameter than the outer side 18 of groove 16 and which, accordingly, defines with that surface an annular space of short radial length on the outside of tube 1. Preferably, this annular space should range from between about .0005″ and about .0025″ in radial length. The tube has a ring-receiving notch at its free end which is defined by a radial extending or transverse surface 30 intersecting with an axially extending surface 31 which terminates at the end of the cylinder in a frusto-conical surface 32.

A sealing ring 35 is positioned in the ring-receiving notch and when in assembled position and ready for operation, this ring is deformed by engagement with surfaces 18, 30 and 31 so that escape of fluid from groove 16 through annular space between wall 18 and surface 25 of the cylinder or tube is prevented. The sealing ring 35 shown in FIGURE 2 is made of a resilient, deformable, elastomeric material. Natural rubber compounds and synthetic polymers may be used but in selecting the material for the ring 35, attention should be paid to the service conditions which it will be called upon to meet. The material selected should be resistant to the expected temperatures, pressures and fluids. For example, synthetic polymers which cannot withstand the action of such liquids as phosphate esters without excessive swelling should not be employed where such esters are present. Synthetic polymers which may be used under many service conditions include buna N, butyl, neoprene, Viton, polyacrylics and silicones.

The ring 35, in its normal condition, has an inner diameter (I.D.) less than the outside diameter (O.D.) of surface 31 and an O.D. greater than the I.D. of surface 18. To facilitate assembly of the ring 35 on the end of the cylinder without damage to the ring, the frusto-conical surface 32 is provided and has a minimum O.D. less than the minimum I.D. of the ring. In assembling the ring with the head and cylinder, the ring 35 is first placed in the head, substantially as shown in FIGURE 3, that is with the ring engaging the bottom surface 19 and outer surface 18. This results in some compression of the ring and deformation of it on surface 18. Then, the end of tube 1 is placed in the hole in the ring and axial relative movement of the ring and tube moves the ring along frusto-conical surface 32 and onto cylindrical surface 31 with consequent stretching of the ring and deformation of it on surface 31. Thus, ring 35 bears on walls 18 and 31 with considerable force, a force sufficient to prevent the escape of fluid past the ring and into the short, radial space between surfaces 18 and 25. When fluid under presure is applied to the inside of cylinder 1, it forces ring 35 against radial surface 30 with further resultant deformation of the ring and increased sealing action of the ring relative to that short radial space.

FIGURE 4 shows a modified form of sealing ring. That ring 40 is made of metal and is hollow with a plurality of radial openings 41 through its wall to permit fluid under pressure to enter the ring and oppose pressure on the outside which otherwise might collapse the ring. Various materials may be used to make ring 40, such as stainless steel, mild steel, aluminum, copper, Inconel and Monel. In selecting the metal to use due consideration should be given to the service conditions which it will be called upon to meet including temperatures, pressures and fluids. The tube 1 and head 2 of this figure and the various illustrated surfaces of each are respectively like the corresponding parts and surfaces of FIGURE 2. The manner of assembling ring 40 with head 2 and tube 1 is substantially the same as has just been described in connection with the parts of FIGURE 2.

It will be understood that ring 40 may be made without holes 41 but with fluid under pressure of several hundred pounds per square inch being sealed in the tube to prevent its collapse.

It will be understood that when the device of FIGURE 1 is assembled and ready for operation as an actuator the tie rods 3 and bolts 4 will be pressing the heads against the ends of the cylinder and the rods will be under tensile stresses somewhat less than approximately 80% of the elastic limit values of the rods. Such tensile forces press the surfaces 15 of the heads against the radial surfaces 20 of the cylinders and prevent relative movement of the head and cylinder under high fluid pressure and even shock and mechanical forces.

The fact that the sealing ring is on the outside of the cylinder and is deformed between radially spaced axial annular surfaces and against a radial surface insures that the resilient, deformed ring will prevent escape of fluid between the head and the cylinder under a wide range of high fluid pressures and including sudden shock pressures. The fact that the annular space between the wall 18 of the head and surface 25 of the cylinder is so short radially insures against the extrusion of even the non-metallic ring into that space and even under pressures of 5000 p.s.i. or more while the size and arrangement of surfaces at the end of the cylinder and in the head insure that the ring may be assembled with the head and cylinder without any danger of cutting or other damage to the ring.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the above specifically described embodiment of the invention may be made without departing from the scope of the invention as set forth in what is claimed.

What is claimed is:

1. A seal for a high pressure hydraulic cylinder comprising a head having an annular groove and a flat surface surrounding said groove, said groove having an inner surface, a bottom surface and an outer surface, a cylinder having an annular radial surface pressed into annular metal-to-metal contact with said flat surface of the head and having an end portion extending into said groove but being out of contact with the surfaces thereof, said end portion having a cylindrical surface on its exterior extending axially from said radial surface toward said bottom surface of the groove and defining with the outer surface of the groove an annular space of short radial length, said end portion of the cylinder having a ring-receiving notch near its free end and open to said outer and bottom surfaces of the groove and partly defined by intersecting axially and radially extending annular surfaces, tie bolt means extending through said head and adjacent to the outer surface of said cylinder to hold the head and cylinder in assembled position when high fluid pressure is exerted within the cylinder, and a resilient deformable ring in said notch, engaging the notch-forming surfaces and the outer surface of the groove, being deformed by said surfaces and exposed to the full fluid pressure in the cylinder, said ring serving to prevent the escape of fluid under pressure from the interior of the cylinder.

2. The combination of elements set forth in claim 1 in which the said space of short radial length has a radial length ranging from between about .0005" and about .0025".

3. The combination of elements set forth in claim 1 in which the said resilient deformable ring is composed of elastomeric non-metallic material.

4. The combination of elements set forth in claim 1 in which the said resilient ring is a hollow metal tube.

5. The combination of elements set forth in claim 1 in which the resilient ring is a hollow metal tube having an opening through its walls for entry of the fluid under pressure in the cylinder to prevent collapse of the tube.

6. The combination of elements set forth in claim 1 in which the resilient ring is a hollow metal tube having fluid under pressure sealed therein.

References Cited in the file of this patent

UNITED STATES PATENTS

| | | |
|---|---|---|
| 2,537,249 | Walton | Jan. 9, 1951 |
| 2,837,360 | Ladd | June 3, 1958 |
| 2,842,284 | Flick | July 8, 1958 |